J. H. M. MICHON.
ACCELERATOR.
APPLICATION FILED NOV. 19, 1920.

1,404,785.

Patented Jan. 31, 1922.
2 SHEETS—SHEET 1.

Inventor
J. H. M. Michon

By Lacey & Lacey, Attorneys

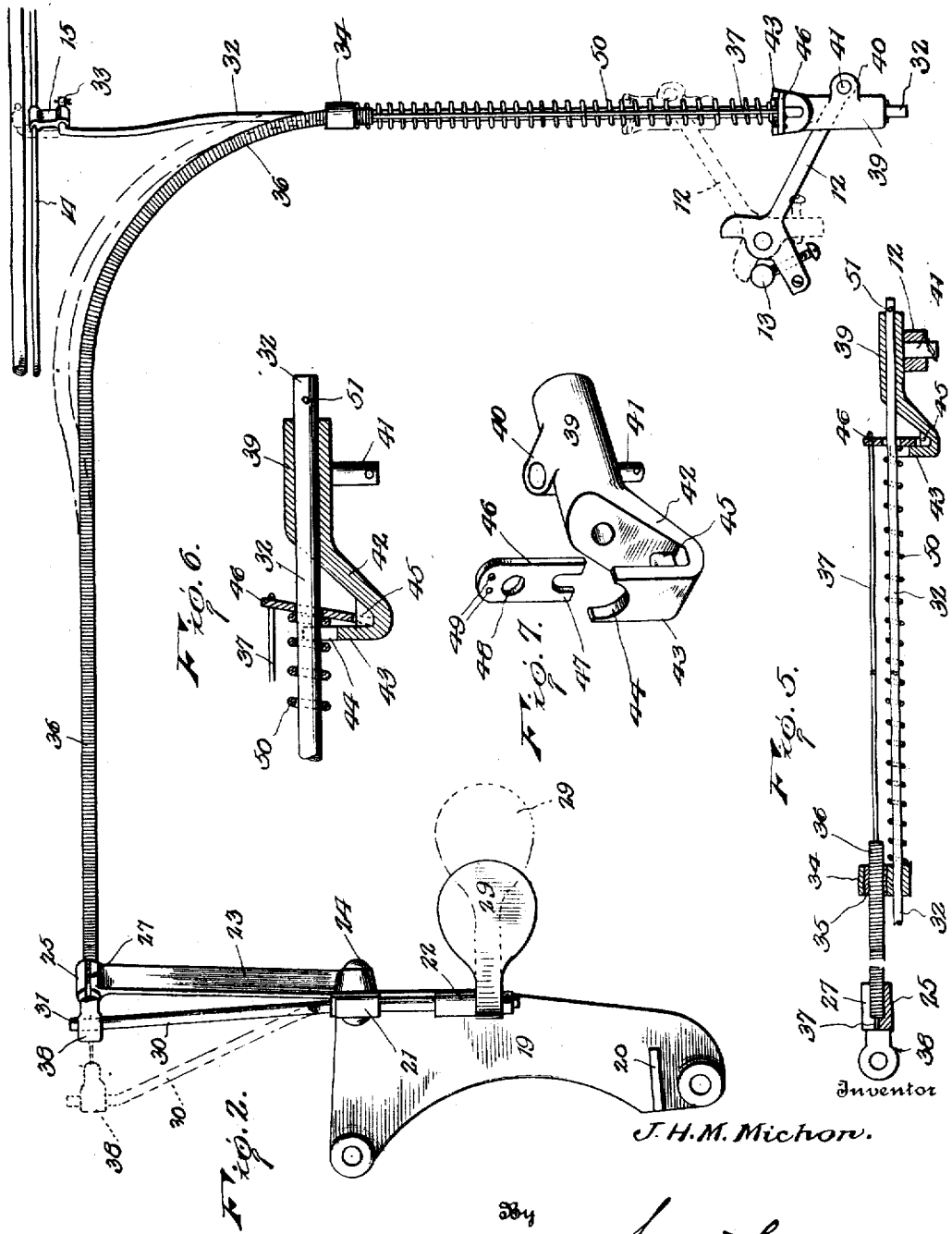

UNITED STATES PATENT OFFICE.

JOSEPH H. M. MICHON, OF TOLEDO, OHIO.

ACCELERATOR.

1,404,785.

Specification of Letters Patent.   Patented Jan. 31, 1922.

Application filed November 19, 1920. Serial No. 425,185.

*To all whom it may concern:*

Be it known that I, JOSEPH H. M. MICHON, a subject of the King of Great Britain, residing at Toledo, in the county of Lucas and State of Ohio, U. S. A., have invented certain new and useful Improvements in Accelerators, of which the following is a specification.

This invention relates to an improved foot accelerator for motor vehicles and has as one of its principal objects to provide a simple and efficient device of this character which may be readily applied and which will dependably operate for controlling a throttle valve.

A further object of the invention is to provide a device embodying means whereby the throttle valve may, in the usual manner, be manually operated independently of the foot lever employed and wherein the foot lever will, when the valve is thus manually operated, remain stationary.

Another object of the invention is to provide an accelerator employing a spring for resisting opening movement of the valve under the influence of the foot lever and which will serve to swing the valve to closed position upon release of the lever but wherein means will be provided for relieving the valve when closed of the major portion of the tension of said spring to thus avoid injury to the valve.

And the invention has as a still further object to provide an accelerator wherein possibility of sticking of the parts will be reduced to a minimum so that the valve may unfailingly be moved to closed position.

Other and incidental objects will appear hereinafter.

In the drawings:

Figure 2 is a plan view of the device.

Figure 5 is a fragmentary sectional view particularly showing the position of the clutch side employed when the throttle valve of the vehicle is closed.

Figure 6 is a sectional view showing the pawl plate of the slide canted, and

Figure 7 is a detail perspective showing the elements of the slide disassembled.

Figure 1:
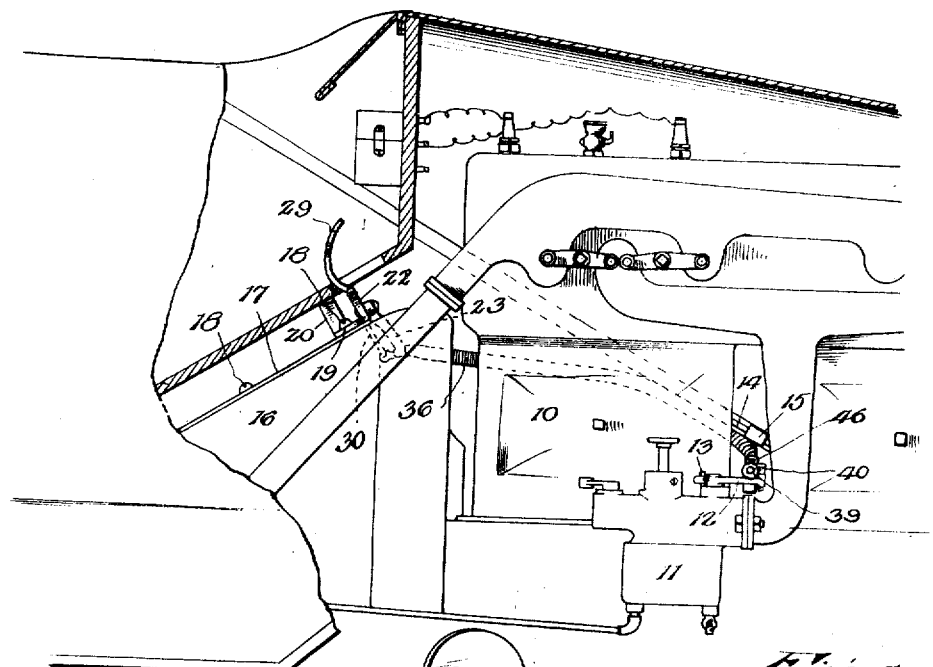
Figure 1 is a fragmentary side elevation showing my improved device connected with a motor vehicle of Ford design, parts being broken away and illustrated in section.

In order that the construction, mounting and operation of my improved accelerator may be accurately understood, I have, in the drawings, shown the device in connection with a motor vehicle of Ford design and accordingly shall so describe the device. However, I do not wish to be limited in this regard since, as shall appear as the description proceeds, the accelerator is well adapted for use upon motor vehicles of various other designs. Referring to Figure 1 of the drawings, the engine of the vehicle is indicated at 10 and the engine carbureter at 11, this carbureter being provided with the usual throttle valve which is operated by a throttle valve lever 12. Upon the carbureter is a stop 13 for limiting the valve in its movement to both open and closed positions. The usual throttle control rod of the vehicle is indicated at 14 and, at its lower end portion, this rod carries an arm 15 to which is connected, under present practice, a rod 80 extending to the valve lever 12 so that as the rod 14 is rotated the valve will be opened and closed. The transmission case of the vehicle is indicated at 16 and closing this case is a door 17 held in position by a plurality of screws 18.

Figure 4:
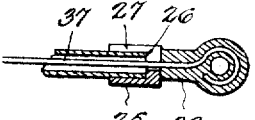
Figure 4 is a fragmentary sectional view showing the manner in which the head for the cable wire employed is connected thereto.

In carrying the invention into effect, I employ a bracket 19 which includes a base plate widened toward one end thereof and provided near its smaller end with an upstanding post 20. Formed in the end portions of the plate are openings adapted to register with the openings at the upper end of the door 17 of the transmission case 16 of the vehicle so that the pair of the screws 18 normally holding this door at its upper end may be engaged through the base plate for securing the bracket in position. As shown in Figure 1, the post 20 of the bracket will thus provide a support for one of the front floor boards of the vehicle. Upstanding from the forward edge of the base plate near its wider end are spaced lugs 21 and 22 and pivoted upon the lug 21 is a laterally directed arm 23 secured at its inner end by a bolt 24 and adjustably foldable to lie along the forward edge of the base plate so that the bracket may be conveniently packed for shipment. At its outer end, the arm 23 is formed with a split socket 25 provided internally, as particularly shown in Figures 4 and 5, with a shoulder 26 and formed at its upper side with a slot 27. Journaled through the lugs 21 and 22 is a foot lever 28 upon one end of which is removably fixed a pedal 29 extending upwardly freely through a suitable opening in the adjacent floor board of the vehicle. The opposite end portion of the lever is bent to provide a depending arm 30 having a laterally directed lower end portion 31 confronting the rear end of the socket 25.

Figure 3:
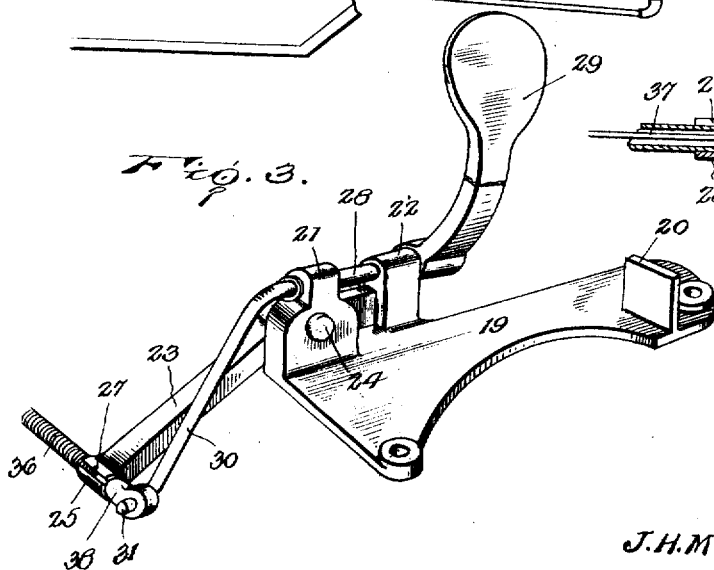
Figure 3 is a detail perspective of the foot lever and bracket therefor.

Supplanting the usual rod which extends between the throttle control rod 14 of the vehicle and the throttle valve lever 12, is an actuating rod 32. At one end this rod is formed with a terminal 33 which is freely engaged through the arm 15 of the throttle control rod and secured by a suitable cotter pin. Throughout the greater portion of its length the rod is straight and secured thereon is a post 34 in which is fixed, as particularly shown in Figure 5, an internally threaded sleeve 35. Fitted through said sleeve is the forward end portion of a flexible cable or sleeve 36. This cable is preferably formed of a helically wound length of material so that the exterior of the cable thus presents, in effect, a coarse thread coacting with the thread of the sleeve so that the cable may accordingly be rotatably adjusted through the sleeve for varying the effective length of the cable. Slidable freely through the cable is a flexible element or wire 37 and mounted upon said wire at its rear end portion is a head 38. As particularly shown in Figure 4, this head is provided with an eye which, as illustrated in Figure 3, receives the laterally directed end portion 31 of the arm 30 of the foot lever therethrough while the head is formed directly upon the wire, the wire being looped within the eye so that the head will thus be effectually secured in position. The socket 25 of the arm 23 of the bracket is formed to freely receive the rear end of the cable 36. Consequently, by spreading the head 38 away from the rear end of the cable, the rear end portion of the cable may be engaged in said socket to abut the shoulder 26 thereof, while the wire 37 may be coincidently passed through the slot 27 of said socket so that the head will be disposed to abut the rear end of the socket when the socket will coact with the wire for holding the head against displacement from the end portion 31 of the arm 30. Mounted upon the outer end portion of the rod 32 in advance of the post 34 is a clutch slide. As shown in detail in Figures 6 and 7 of the drawings, this slide includes a tubular body 39 freely receiving the rod therethrough and formed on the body at one side thereof is a lateral lug 40 in which is fixed a depending post 41. This post, as shown in Figure 5, is freely engaged through the eye of the throttle valve lever 12, being held against displacement by a suitable cotter pin. Formed on the body at its rear end is a rearwardly and downwardly inclined arm 42 which extends below the rod and formed on the lower end of said arm is an upstanding vertically disposed stop plate 43 lying at an acute angle to the flat upper face of the arm. At its upper end this plate is provided with a semi-circular notch 44 and extending transversely across the bight of the arm is an upstanding medial bight of the arm 45 operating to rigidly integral bracing rib 45 operating to rigidly sustain the plate with respect to the arm. Coacting with the stop plate 43 is a pawl plate 46 provided at its lower end with spaced lugs 47 which freely straddle the rib 45 so that said lugs thus rest within the bight of the arm 42 sustaining the plate to rock therewith. Formed through the upper end portion of the plate is an opening 48 freely receiving the rod 32 therethrough and above said opening, the plate is provided with spaced apertures 49 through which is engaged the forward end portion of the wire 37, the rib 45 coacting with the lugs 47 for holding the plate against rotation upon the rod. Surrounding the rod 32 to bear between the post 34 and the pawl plate is a spring 50 freely received through the notch 44 of the plate 43 and urging the slide toward the forward end of the rod.

Attention is now directed to the fact that the spring 50 will normally maintain the pawl plate 46 of the clutch slide in vertical position lying at substantially right angles to the rod 32 while in the closed position of the throttle valve, as shown in Figure 2, the head 38 will abut the socket 25 of the bracket arm 23 for limiting the pawl plate in its forward movement upon the rod under the influence of said spring. Consequently, the major portion of the force of the spring will be communicated to the head 38 and be sustained by the bracket arm 23. However, when the pawl plate thus reaches the end of its throw and is stopped by the head 38, the action of the spring tending to hold the pawl plate in vertical position will cause the lugs 47 of the plate to coact with the arm 40 of the body of the slide for yieldably holding the slide body advanced, pressing the throttle valve closed. Thus, a relatively strong spring may be employed for insuring a positive and quick closing of the throttle valve while, at the same time, undue pressure against the valve when closed will be obviated to, in turn, avoid injury to the valve, only the influence of the spring operating to hold the pawl plate in vertical position acting against the valve when closed. In this connection it is to be observed that by adjusting the sleeve 36 through the post 34 to vary the effective length of the sleeve, as previously mentioned, the curvature of the rear end portion of the wire 37, as defined by said sleeve, may, in turn, be varied for varying the normal position of the throttle valve. For instance, adjustment of the sleeve forwardly through the post 34 will serve to decrease the bend in the forward end portion of the sleeve which will, in effect, operate to lengthen the wire 37 so that the throttle valve will, when the foot pedal is released, be moved by the spring 50 to full closed position. On the other hand, by adjusting the sleeve rearwardly through the post to thus retract the sleeve, the bend in the inner end portion of the sleeve will be increased which will, in effect, serve to shorten the effective length of the wire 37. Accordingly, the throw of the clutch slide will be shortened so that the throttle valve will be permitted to move only to partially closed position under the inflence of the spring. Thus, adjustment of the sleeve upon the post provides a convenient means whereby the normal position of the valve may be readily varied at any time and, as will be appreciated, this is a feature of marked advantage and convenience since, as is well known, it is in practice often desired to change the normal position of the throttle valve of an engine carbureter for varying the speed of the engine when the throttle valve is closed as far as possible.

After the pawl plate has reached the end of its throw forwardly, canting of said plate under the influence of the spring tending to shift the lower end of the plate forwardly will, as will be perceived, be limited by the stop plate 43, the action of the pawl plate tending to advance the body of the slide forwardly serving to move the stop plate into engagement with the pawl plate seating flat against the rear side thereof. Consequently, the pawl plate will be locked against forward canting so that when the pedal 29 of the foot lever is rocked forwardly or depressed, the wire 37 will operate upon the pawl plate for drawing the clutch slide rearwardly upon the rod 32, compressing the spring 50 and opening the throttle valve. Upon the release of said lever, the spring will, of course, immediately project the slide for returning the foot lever and again closing the valve. The throttle valve may accordingly be controlled at will by the foot lever independently of the hand throttle lever. When the hand throttle lever of the vehicle is moved in a direction for opening the valve, the rod 32 will be shifted rearwardly and, as will be seen, the clutch slide and the spring 50 will move as a unit with the rod, the forward end portion of the cable 36 as well as the forward portion of the wire 37 within the cable flexing as the rod is moved. Consequently, the throttle valve will be opened while, due to the flexing of the cable and wire, the foot lever will remain stationary, held retracted by said spring. Upon movement of the hand throttle lever to close the valve, the rod 32 will be shifted forwardly and, of course, the spring 50 will resist rearward movement of the pawl plate 46 upon the rod. However, as will be at once appreciated, the throttle valve will exert a resistance against the stud 41 of the slide so that as the rod is advanced, the slide body will, as shown in Figure 6, be shifted rearwardly upon the rod for canting the pawl plate rearwardly. Said plate will thus be caused to grip the rod for positively locking the the slide fixed thereon so that as the forward movement of the rod is continued, the throttle valve will be positively closed. The cable 36 and wire 37 will, of course, flex when the throttle valve is thus closed so that, like when the throttle valve is opened by the hand lever, the foot lever will remain stationary. Consequently, the throttle valve may be either opened or closed by the hand lever without any corresponding movement of the foot lever. By setting the hand lever, the closing movement of the throttle valve may be controlled for thus limiting the closing of the valve when operated by the foot lever. Formed through the outer end portion of the rod 32 is an opening 51. Should the wire 37 become broken in the practical use of the device, a cotter pin or other suitable stop element may be engaged through this opening for limiting the clutch slide in its forward movement upon the rod under the influence of the spring 50. Consequently, even though the foot control of the throttle valve becomes disabled, said valve may, nevertheless, still be operated by the hand control, the spring 50, of course, having sufficient tension to maintain the clutch slide at the limit of its forward throw upon the rod. I accordingly provide a highly efficient accelerator and, as will now be readily understood, a device which may be applied simply by displacing the usual cross rod between the throttle control rod 14 and the throttle valve lever 12 and substituting the rod 32 therefor, the terminal 33 being, as previously explained, engaged with the arm 15 of the control rod while the post 41 of the clutch slide is engaged with the lever 12. Then, after the foot lever bracket has been mounted in position, the outer end of the cable 36 may be engaged in the socket 25 of the bracket arm 23 when, by engaging the head 38 with the end portion 31 of the arm 30 of the foot lever, the device will be ready for operation, it being observed that no special tools will be required in order to thus apply the device.

Having thus described the invention, what is claimed as new is:

1. A device of the character described including an actuating rod, and foot operated means associated with the rod and engageable with a throttle valve, said means being movable independently of the rod to open the valve and being automatically operable to resist independent movement when the rod is shifted for closing the valve.

2. A device of the character described including an actuating rod, and foot operated means slidable upon the rod and engageable with a throttle valve, said means being movable independently of the rod to actuate the valve and operable to grip the rod whereby the rod may be shifted for actuating the valve.

3. A device of the character described including an actuating rod, and foot operated means associated with the rod engageable with a throttle valve and movable independently of said rod for actuating the valve, said means being limited against independent movement in one direction upon the rod and operable to grip the rod when said rod is moved in said direction whereby the rod may be shifted for actuating the valve.

4. A device of the character described including an actuating rod, means engageable with a throttle valve slidable upon the rod and including an element loose thereon, said means being movable independently of the rod for actuating the valve, yieldable means urging the first means to close the valve and acting against said element, and means connected to said element limiting the first means in its movement near the closed position of the valve whereby only the tension of the yieldable means operating to rock said element will hold the valve closed.

5. A device of the character described including an operating rod, means slidable thereon engageable with a throttle valve and movable independently of the rod for actuating the valve, said means including a pawl plate loose upon the rod, yieldable means acting against said pawl plate for shifting the first means to a position closing the valve, and means limiting the first means in its movement near the closed position of the valve and connected to said plate whereby only the tension of said yieldable means operating to rock the plate will act to hold the valve closed.

6. A device of the character described including an operating rod, a clutch slide thereon engageable with a throttle valve and movable independently of the rod for actuating the valve, said slide being operable to grip the rod when said rod is shifted in one direction, and means limiting the slide in its movement upon the rod in the opposite direction whereby the rod may be shifted for actuating the valve.

7. A device of the character described including an operating rod, a clutch slide thereon including a slide body, a pawl plate mounted to rock thereon, the body being engageable with a throttle valve and the pawl plate being loose on the rod, yieldable means acting against the pawl plate normally holding the valve closed, the slide being movable independently of the rod against the tension of said means for opening the valve, and means connected to said pawl plate limiting the slide in its movement near the closed position of the valve whereby only the tension of the spring operating to rock the pawl plate will act to hold the valve closed, the body being shiftable for canting the pawl plate to grip the rod whereby the rod may be shifted for closing the valve.

8. A device of the character described including an actuating rod, a flexible sleeve connected thereto, means associated with the rod and engageable with a throttle valve, flexible means extending through said sleeve and connected to the first means for shifting the first means independently of the rod and actuating the valve, and means associated with the second means limiting the first means in its independent movement in one direction, the first means being operable to coact with the rod for movement therewith when shifted in the opposite direction whereby the rod may be moved for actuating the valve.

9. A device of the character described including an actuating rod, a slide body shiftable thereon and having an arm provided with stop means, means carried by the body for engagement with a throttle valve, a pawl plate mounted to rock upon the arm and loosely receiving the rod therethrough, the pawl plate being movable to a position locking between the arm and said stop means, means connected to the pawl plate for shifting the slide body in one direction, and yieldable means acting against the pawl plate for shifting the slide body in the opposite direction, the body being movable independently of the plate for canting the plate in engagement with the rod.

10. A device of the character described including a bracket body, an arm carried thereby and provided with a socket, a foot lever mounted to rock upon the bracket and having an arm confronting said socket, an actuating rod, a cable connected at one end portion with the rod and having its opposite end received in said socket, means engageable with a throttle valve slidable upon the rod, and a flexible element in said cable connected at one end portion with said means and at its opposite end portion with said lever.

11. A device of the character described including an actuating rod, a slide body shiftable thereon and having a depending arm provided with an upstanding stop plate, there being a bracing rib extending between the arm and plate, a pawl plate mounted to rock between the arm and stop plate and having lugs straddling said rib, the pawl plate loosely receiving the rod therethrough and being movable to a position locking between the arm and stop plate, means connected to the pawl plate for shifting the slide body in one direction, and yieldable means acting against the pawl plate for shifting the slide body in the opposite direction, the body being movable independently of the plate for canting the plate in engagement with the rod.

12. A device of the character described including an actuating rod, a flexible sleeve having adjustable connection with the rod whereby the effective length of the sleeve may be varied, means shiftable upon the rod and engageable with a throttle valve, and means extending through said sleeve connected to the first means and operable for shifting the first means.

13. A device of the character described including an actuating rod, a post fixed thereon, a flexible sleeve adjustable through said post whereby the effective length of the sleeve may be varied, means shiftable upon the rod and engageable with a throttle valve, and means extending through said sleeve connected to the first means and operable for shifting the first means.

14. A device of the character described including an actuating rod, means shiftable thereon and engageable with a throttle valve, means connected to the first means for shifting the first means, and means coacting with the second means and adjustable for varying the effective length thereof whereby to vary the throw of the first means.

15. A device of the character described including an actuating rod, means shiftable thereon and engageable with a throttle valve, a flexible element connected to said means for shifting said means, and means slidably receiving the flexible element therethrough and having adjustable connection with the rod whereby the effective length of said element may be varied for varying the throw of the first means.

16. A device of the character described including an actuating rod, spring pressed foot operated means upon the rod engageable with a throttle valve, and means for relieving the valve of the major portion of the spring tension upon said means at the end of the throw of said means.

17. A device of the character described including an actuating rod, a slide body thereon, a pawl plate mounted to rock upon the body loosely receiving the rod therethrough, yieldable means acting against the pawl plate normally shifting the body to the end of its throw, and means connected to said plate for limiting the body at the end of its throw and relieving the body of the major portion of the tension of said spring.

In testimony whereof I affix my signature.

JOSEPH H. M. MICHON. [L. S.]